United States Patent Office 2,824,018
Patented Feb. 18, 1958

2,824,018

FILM-FORMING COMPOSITION WITH A TEREPHTHALAMIDE ESTER PLASTICIZER

Ralph T. K. Cornwell, Rosemont, Pa., assignor to American Viscose Corporation, Philadelphia, Pa., a corporation of Delaware No Drawing. Application July 29, 1955
Serial No. 525,350

4 Claims. (Cl. 106—180)

This invention relates to novel compositions of matter, more specifically, to the combination of a film-forming polymer, natural or synthetic, with a terephthalamide ester as a plasticizer. This application is a continuation-in-part of my application Serial No. 333,616, filed January 27, 1953, now abandoned, which in turn is a continuation-in-part of my application Serial No. 135,835, filed December 29, 1949, now abandoned, which in turn is a continuation-in-part of my application Serial No. 75,965, filed February 11, 1949, now abandoned.

The terephthalamide ester component of the present invention is formed by the reaction of a dioyl chloride with N,N'-bis-(beta-hydroxyethyl)-terephthalamide. The compounds may be represented by the following generic formula

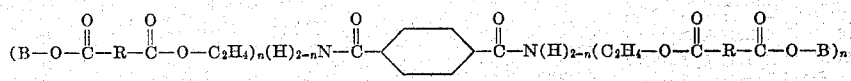

wherein $n$ is an integer having a value from 1 to 2, R is a divalent radical selected from the group consisting of alkyl, aryl, alicyclic, and aralkyl radicals having a chain length of from 3 to 12 carbon atoms and B is selected from the group consisting of hydrogen and

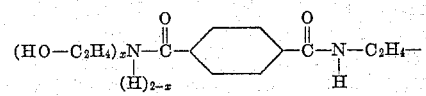

wherein $x$ is an integer having a value from 1 to 2.

These compounds have been prepared and found to vary from white crystalline solids to brownish resinous substances and are useful as intermediates in the production of synthetic resins and fibers and as plasticizers for high polymers.

These esters may be prepared as follows: monoethanolamine or di-ethanolamine is heated with a terephthalic acid or acid ester such as diethyl terephthalate in ethyl alcohol until a clear solution of the reactants is obtained. The reaction product, N,N'-bis-(beta-hydroxyethyl)-terephthalamide or N,N'-tetra-(beta-hydroxyethyl)-terephthalamide, is removed from the solution and further reacted with a dioyl chloride to produce the corresponding ester thereof. For example, the mixture of reactants in ethyl alcohol may be heated until the clear solution is obtained and the heating continued until all of the alcohol has been removed, usually 4 to 6 hours, or the clear solution allowed to stand for about 12 hours at room temperature until the reaction product crystallizes. The product is then reacted with a dioyl chloride to produce the corresponding ester. Any dioyl chloride may be used having a carbon chain length of from 5 to 14 carbon atoms, such as pentanedioyl chloride, hexanedioyl chloride, heptanedioyl chloride, octanedioyl chloride, nonanedioyl chloride, decanedioyl chloride, benzenedicarbonyl chloride, cyclohexanedioyl chloride, naphthenedicarbonyl chloride, the chloride of p-phenoxyacetic acid, adipyl chloride, suberyl chloride, oxalyl chloride, and the like. Aralkyl dioyl chlorides include the chlorides of methyl-, ethyl-, propyl-, butyl-, amyl-, and hexyl-benzenedicarboxylic acid.

The following examples illustrate preferred methods for the preparation of terephthalamide derivatives contemplated by the present invention.

EXAMPLE I

*Adipate of N,N'-bis-(beta-hydroxyethyl)-terephthalamide*

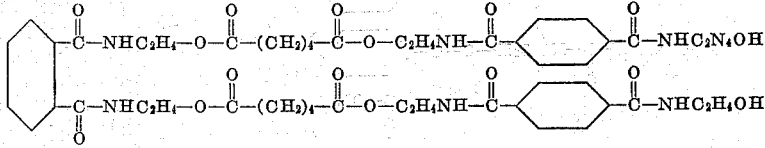

N,N'-bis-(beta-hydroxyethyl)-terephthalamide (5 g., 0.02 mole) was dissolved in 135 cc. pyridine at a slight boil. Adipyl chloride (2.4 g., 0.013 mole) was added slowly over a period of 1½ hours. Refluxing was continued for another half hour. One cc. of water was added to the reaction mixture to take care of the pyridine hydrochloride formed, and the mixture was then poured into 700 cc. cold toluene. Brown crystals were recovered on chilling in an icebox. The crystals were recrystallized from boiling ethanol using decolorizing Darco. The final product, which had a faint purple cast to the crystals, was obtained in 64.5 percent yield. It yellowed at 160° C., browned at 190° C., and melted at 216° C. The product, $C_{48}H_{60}N_6O_{16}$, analyzed as follows:

Theory: C, 58.80; H, 6.19; N, 8.61
Found: C, 56.79; H, 7.01; N, 8.77

The product was insoluble in water, acetone, n-heptane, toluene, benzene, cyclohexane, ethyl acetate, and ethyl ether. It was soluble in pyridine and hot ethanol and butanol.

EXAMPLE II

*Di (acid phthalate) of N,N'-bis-(beta-hydroxyethyl)-terephthalamide*

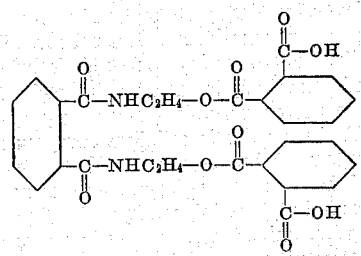

The terephthalamide, N,N'-bis-(beta-hydroxyethyl)-terephthalamide (5 g., 0.02 mole), was dissolved in 100 cc. of pyridine at a slight boil. o-Phthalic anhydride (6 g., 0.041 mole) dissolved in 35 cc. of pyridine was added slowly over a period of 2½ hours. Refluxing was continued for another half hour. The pyridine was then distilled off under vacuum until the temperature started to rise. The viscous brown material remaining was placed into 500 cc. of hot toluene which was then cooled. The brown semi-solid material recovered was dissolved in hot pyridine which was then placed in ice water. The light tan crystals recovered turned yellow at 105° C. and melted at 230° C. The product, $C_{28}H_{24}O_{10}N_2$, analyzed as follows:

Theory: C, 61.50; H, 4.41; N, 5.09
Found: C, 63.31; H, 4.58; N, 4.56

The product was insoluble in water, ethanol, acetone, n-heptane, toluene, benzene, chloroform, cyclohexane, 1,4-dioxane, ethyl acetate, and ethyl ether. The compound was slightly soluble in hot chloroform and completely soluble in hot pyridine.

EXAMPLE III

*Tetra (acid phthalate) of N,N'-tetra-(beta-hydroxyethyl)-terephthalamide*

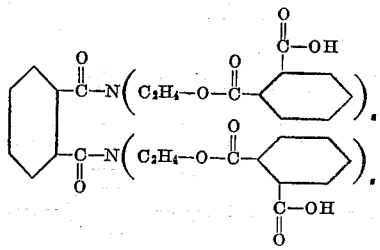

The terephthalamide, N,N'-tetra-(beta-hydroxyethyl)-terephthalamide (10 g., 0.029 mole), was dissolved in 75 cc. of pyridine. Phthalic anhydride (17.5 g., 0.118 mole) dissolved in 50 cc. of pyridine was added slowly over a period of 1½ hours and refluxing was continued for an additional hour. The reaction mixture was placed into 1 liter of cold toluene. The oil that separated out was washed repeatedly with cold water and hot ether. A brown resin-like material with a softening point of 104° C. was obtained. The compound was insoluble in water, ethanol, acetone, n-heptane, benzene, toluene, chloroform, 1,4-dioxane, cyclohexane, ethyl acetate, and ethyl ether. It was slightly soluble in hot acetone, benzene, toluene, and chloroform and soluble in hot pyridine.

The esters described above are preferably used as plasticizers and coating agents for cellulosic films and sheets. For example, they may be employed as the plasticizer in moistureproofing and/or heat-sealing coatings for cellophane, such as those described in my Patents 2,487,105 and 2,487,106. Other film-forming materials which may be plasticized by the dipropionate of the present invention include (1) thermoplastic resins such as polyvinyl chloride, polyvinylidene chloride, polystyrene, copolymers of vinyl chloride and vinyl acetate, copolymers of methyl methacrylate and vinyl chloride, polyvinyl butyral, polyvinyl acetal, polymethyl methacrylate, polymethyl acrylate, polyethylene, polyamides, natural rubbers, synthetic rubbers; chlorinated rubber, polysulfides, polyisobutylenes, cyclized rubber, rubber hydrochloride, buna rubber, coumarone-indene with rubber, oil-modified and unmodified alkyd resins prepared from dihydroxy alcohols and dicarboxylic acids, phenol-formaldehyde resins prepared from phenols having only two reactive positions, (2) thermoplastic cellulose compounds such as cellulose acetate, cellulose acetate butyrate, cellulose acetate propionate, cellulose propionate, benzyl cellulose, ethyl cellulose, butyl cellulose, hydroxyethyl cellulose, cellulose nitrate, mixed esters or ether-esters such as cellulose acetate-nitrate, cellulose acetate-propionate or ethyl cellulose-nitrate, (3) such thermosetting resins as urea-formaldehyde, phenol-formaldehyde (phenols having three reactive positions), melamine-formaldehyde, alkyd resins prepared from polyhydric alcohols and polycarboxylic acids, phenol-furfural, unsaturated polyesters, polyallyl alcohol and derivatives, protein-formaldehyde resins such as casein-formaldehyde and shellac-formaldehyde and (4) mixtures of thermoplastic and thermosetting resins such as polyvinyl chloride and urea-formaldehyde-butanol ether, polyvinyl chloride and phenol-formaldehyde, polymethacrylate and urea-formaldehyde, polystyrene and alkyd, coumarone-indene and alkyd, polyvinyl acetal and melamine-formaldehyde. In such compositions, the film-forming material may be present in a proportion of 40 to 95% by weight of the total solids in the composition, and the dipropionate of the present invention may be present in a proportion of 5 to 45% by weight of the total solids.

While it is an advantage of the present plasticizers that they possess solvent powers for so many plastic components that they can normally be used as the only plasticizer, the invention is by no means limited to plastic compositions in which it is the only plasticizer present. On the contrary, it may be associated with other plasticizers such, for example, as dibutyl phthalate, dilauryl phthalate, cyclohexyl butyl phthalate, di(methylcyclohexyl) phthalate, di(dimethylcyclohexyl) adipate, dicyclohexyl adipate, tricresyl phosphate, esters of o-benzoyl benzoic acid such as butyl benzoyl benzoate derivatives of toluene sulfonamide, or the like.

As moistureproofing agents, waxes or wax-like material such as paraffin, petrolatum, ceresin, japan wax, palm wax, beeswax, certain chlorinated hydrocarbons, Chinese insect wax, or other synthetic waxes or wax-like materials may be used. If some of these waxes are too soft for the purpose desired, they may be mixed with harder waxes of the group or with carnauba wax, candelilla wax or other harder waxes. Generally, paraffin serves as a satisfactory moistureproofing agent which may be hardened, if necessary, by admixture with carnauba wax or candelilla wax.

In the preparation of moistureproofing coating compositions comprising a cellulose derivative and a moistureproofing agent, it is advantageous to include some material which will improve the compatibility of these two ingredients. This material is referred to as a blending agent and is usually of a resinous nature, although this is not absolutely necessary. When the blending agent is resinous, advantage may be taken of its film-forming characteristics, if any, and sufficient quantity may be added to a coating composition to contribute towards the body and build of that composition in addition to the blending action. Depending on the nature of the blending agent, more or less plasticizing action on the cellulose derivative may be obtained.

As the blending agents, any of the natural or synthetic resins commonly available may be used so long as they are compatible and form homogeneous mixtures. Such resins may include ester gum, rosinates, hydrogenated rosin, hydrogenated rosin esters, dammar, copal, kauri, alkyd resins, vinyl derivatives, chlorinated diphenyl resins, and soluble resin of the phenol-formaldehyde type. Non-resinous blending agents may be used when they yield homogeneous mixtures and these may include hydrogenated castor oil, castor oil phthalate, lanolin or wool grease, ethyl abietate, methyl abietate, diethylene glycol rosinate, diethylene glycol hydrorosinate, or the like.

It is the most convenient to apply the above lacquer and moistureproofing coating compositions to base materials, such as sheets of regenerated cellulose, by means of suitable solvents. Thus, the film-forming ingredients may be dissolved to give a coating solution of an appropriate viscosity and solids content, whereupon the solution may be applied to the desired base in accordance with the methods known in the art. The solvents may be removed and the coated base subjected to an elevated temperature at least equal to the melting point of the wax, whence, after cooling, a clear, transparent moistureproof, coated base will be obtained.

These moistureproofing compositions may be applied to various sheet material to produce wrapping tissues which are flexible, moistureproof and heat-sealable and which exhibit highly improved surface characteristics including excellent surface slip and resistance to caking, sticking, or marring during storage. A variety of base sheet materials may be used, such as cellulosic materials, paper, albuminous materials (gelatin, agar-agar, casein), or films made from rubber derivatives, that is, rubber hydrochloride, chlorinated rubber, or the material prepared by reacting rubber and a metal halide such as boron trifluoride, stannous or stannic chloride, stannic acid, and other materials. In the preferred embodiment of the invention, a non-porous, non-fibrous, dense, smooth surfaced, and preferably transparent material such as regenerated cellulose, cellulose ester films including cellulose nitrate and cellulose acetate, or cellulose ether films including ethyl cellulose, benzyl cellulose, glycol cellulose, or lowly etherified cellulose such as those in which there is only one substituent group for several glucose units of cellulose is employed.

In such compositions, the film-forming material may be present in a proportion of 40 to 95 percent by weight of the total solids in the composition, and the esters of the present invention may be present in a proportion of 5 to 34 percent by weight of the total solids.

In the following examples using the esters of the present invention plasticizers are used as heat-sealing and moistureproofing lacquers for application to cellophane, the parts given are by weight.

EXAMPLE A

| | Parts |
|---|---|
| Nitrocellulose | 50 |
| The product of Example I | 35 |
| Paraffin, melting point 67° C | 4 |
| Ester gum | 10 |
| Blown rapeseed oil | 1 |

One part of the above composition was dissolved in about 250 parts of a solvent mixture containing 15 parts ethyl acetate, 15 parts butyl acetate and 70 parts toluene. The solution was then applied as a coating to cellophane and dried in the usual way. The resulting sheet was moistureproof and remained flexible.

EXAMPLE B

| | Parts |
|---|---|
| Nitrocellulose | 45 |
| Compound of Example II | 22 |
| Dibutyl phthalate | 7.5 |
| Paraffin, melting point 67° C | 5 |
| Ester gum | 20 |
| Blown rapeseed oil | 0.5 |

One part of the composition was dissolved in 250 parts of the solvent containing 15 parts ethyl acetate, 15 parts butyl acetate and 70 parts toluene. The resulting mixture was applied as a coating to a sheet of cellophane and the sheet was allowed to dry. The resulting sheet was flexible and moistureproof.

It is to be understood that changes and variations may be made without departing from the spirit and scope of the invention as defined in the appended claims.

I claim:

1. A composition of matter comprising (1) an organic plastic film-forming material selected from the group consisting of thermoplastic resins, thermoplastic cellulose esters and ethers, thermosetting resins, mixtures of thermoplastic and thermosetting resins and (2) as a plasticizer a compound having the formula

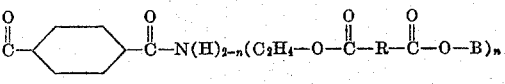

where $n$ is 1 or 2, R is selected from the group consisting of alkyl, aryl, alicyclic, and aralkyl radicals having a chain length of from 3 to 12 carbon atoms and B is selected from the group consisting of hydrogen and

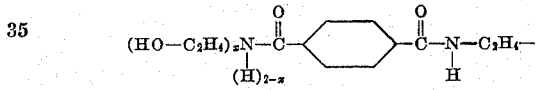

wherein $x$ is 1 or 2, said plasticizer being present in a proportion of 5 to 45% by weight of the total solids.

2. Composition of claim 1 wherein the plasticizer is an adipate of N,N'-bis-(beta-hydroxyethyl)-terephthalamide.

3. Composition of claim 1 wherein the plasticizer is the di (acid phthalate) of N,N'-bis-(beta-hydroxyethyl)-terephthalamide.

4. Composition of claim 1 wherein the plasticizer is the tetra (acid phthalate) of N,N'-tetra-(beta-hydroxyethyl)-terephthalamide.

References Cited in the file of this patent

UNITED STATES PATENTS

| 2,487,106 | Cornwell | Nov. 8, 1949 |
|---|---|---|
| 2,552,321 | Jayne et al. | May 8, 1951 |

UNITED STATES PATENT OFFICE

Certificate of Correction

Patent No. 2,824,018 February 18, 1958

Ralph T. K. Cornwell

It is hereby certified that error appears in the printed specification of the above numbered patent requiring correction and that the said Letters Patent should read as corrected below.

Columns 1 and 2, lines 21 to 24, Example I, for the extreme right-hand portion of the formula reading column 2, lines 57 to 67, Example II, the formula should appear as shown below instead of as in the patent:

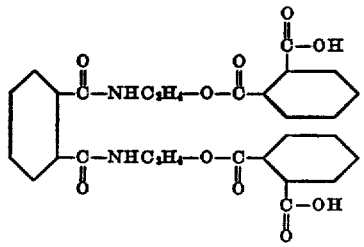

column 3, lines 25 to 35, Example III, the formula should appear as shown below instead of as in the patent:

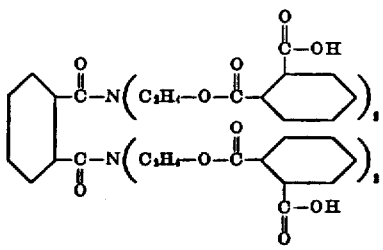

Signed and sealed this 11th day of November 1958.

[SEAL]

Attest:
KARL H. AXLINE,
Attesting Officer.

ROBERT C. WATSON,
Commissioner of Patents.